US007530093B2

(12) United States Patent
Samuelsson et al.

(10) Patent No.: US 7,530,093 B2
(45) Date of Patent: May 5, 2009

(54) SECURING APPLICATIONS AND OPERATING SYSTEMS

(75) Inventors: Anders Samuelsson, Redmond, WA (US); Steven Townsend, Seattle, WA (US); Thomas Fakes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 931 days.

(21) Appl. No.: 10/836,810

(22) Filed: Apr. 30, 2004

(65) Prior Publication Data

US 2005/0246522 A1    Nov. 3, 2005

(51) Int. Cl.
*G06F 17/00* (2006.01)
*H04K 1/00* (2006.01)
*H04L 9/00* (2006.01)

(52) U.S. Cl. .......................................... 726/1; 713/105
(58) Field of Classification Search ................... 84/626; 707/100; 713/105, 165, 169; 726/1
See application file for complete search history.

(56) References Cited

U.S. PATENT DOCUMENTS

| | | | |
|---|---|---|---|
| 5,361,359 A | 11/1994 | Tajalli et al. | |
| 5,386,564 A | 1/1995 | Shearer et al. | |
| 5,915,085 A | 6/1999 | Koved | |
| 5,958,050 A | 9/1999 | Griffin et al. | |
| 5,991,877 A | 11/1999 | Luckenbaugh | |
| 6,070,244 A | 5/2000 | Orchier et al. | |
| 6,301,669 B2 | 10/2001 | Boden et al. | |
| 6,405,212 B1 | 6/2002 | Samu et al. | |
| 6,484,261 B1 | 11/2002 | Wiegel | |
| 6,646,195 B1 * | 11/2003 | Puryear | 84/626 |
| 7,072,967 B1 | 7/2006 | Saulpaugh et al. | |
| 7,296,154 B2 * | 11/2007 | Evans et al. | 713/169 |
| 2002/0019935 A1 * | 2/2002 | Andrew et al. | 713/165 |
| 2002/0123966 A1 | 9/2002 | Chu et al. | |
| 2003/0177129 A1 * | 9/2003 | Bond et al. | 707/100 |
| 2003/0229805 A1 | 12/2003 | Perry | |
| 2004/0060425 A1 * | 4/2004 | Puryear | 84/626 |
| 2004/0064727 A1 | 4/2004 | Yadav | |
| 2004/0123188 A1 | 6/2004 | Srinivasan et al. | |
| 2004/0143736 A1 * | 7/2004 | Cross et al. | 713/165 |
| 2004/0193718 A1 | 9/2004 | Huang et al. | |

(Continued)

OTHER PUBLICATIONS

D.R Engler, Exokernel: An Operating System Architecture for Application-Level Resource Management, Dec. 1995, M.I.T laboratory, pp. 251-266.*

(Continued)

*Primary Examiner*—Kambiz Zand
*Assistant Examiner*—Monjour Rahim
(74) *Attorney, Agent, or Firm*—Perkins Coie LLP

(57) ABSTRACT

Techniques for securing applications and operating systems are provided. In an embodiment, the system notifies a user that a security enforcement action is being taken even though the condition prompting the action is detected by a security engine that executes in kernel mode. The security engine enforces security policies that help to ensure that a vulnerability of an application or operating system cannot be exploited. In an embodiment, the security system may solicit input from a user relating to a security enforcement action even though the condition prompting the action is detected by a security engine that executes in kernel mode. Security policies may be defined as sets of rules, each having a condition and an action. The security system thus enables kernel mode components to provide notifications to a user or solicit input from the user.

49 Claims, 6 Drawing Sheets

U.S. PATENT DOCUMENTS

| | | | |
|---|---|---|---|
| 2004/0250127 | A1 | 12/2004 | Scoredos et al. |
| 2005/0010819 | A1 | 1/2005 | Williams et al. |
| 2005/0028006 | A1 | 2/2005 | Leser et al. |
| 2005/0125685 | A1 | 6/2005 | Samuelsson et al. |
| 2005/0246522 | A1* | 11/2005 | Samuelsson et al. ........ 713/150 |
| 2006/0005227 | A1* | 1/2006 | Samuelsson et al. ........... 726/1 |
| 2006/0048209 | A1 | 3/2006 | Shelest et al. |
| 2006/0161965 | A1 | 7/2006 | Shelest et al. |
| 2006/0282876 | A1 | 12/2006 | Shelest et al. |

OTHER PUBLICATIONS

Steven M. Bellovin, Sub-operating systems: a new approach to application security, Year:2002, ACM—New York, pp. 108-115.*

U.S. Appl. No. 10/882,438, filed Jul. 1, 2004, Samuelsson et al.

U.S. Appl. No. 10/898,463, filed Jul. 23, 2004, Townsend et al.

Yolanta Beres and Chris I. Dalton, "Dynamic Label Binding at Runtime," New Security Paradigms Workshop 2003, Ascona, Switzerland, ACM 2004 (8 pages).

Sushil Jajodia, et al., "A Unified Framework for Enforcing Multiple Access Control Policies," SIGMOD '97 Arizona, ACM 1997 (12 pages).

Emin Gun Sirer and Ke Wang, "An Access Control Language for Web Services," SACMAT '02 Monterey, California, Jun. 3-4, 2002 (8 pages).

* cited by examiner

Host Services: register_policy

SECURING APPLICATIONS AND OPERATING SYSTEMS

TECHNICAL FIELD

The described technology relates generally to operating systems and, more particularly, to securing applications and operating systems.

BACKGROUND

An operating system performs various tasks relating to a computer system, including managing its hardware and software resources. Hardware resources include processors, primary storage (e.g., memory), secondary storage (e.g., hard disk or optical disk), printers, display adapters, network interface cards, input/output ports, etc. Software resources include application programs, user interfaces, device drivers, network protocol stacks, etc. The operating system manages and coordinates these resources to complete various tasks, such as under the direction of an application program.

Operating systems may complete their tasks in user mode or in kernel mode. When in user mode, components of the operating system generally perform tasks relating to application programs. When in kernel mode, components of the operating system generally perform tasks relating to managing hardware devices, device drivers, the operating system itself, and other tasks not directly relating to application programs.

User mode components, such as applications, generally operate in an unprivileged security context. In this unprivileged security context, the operating system and computer system impose constraints on the components including restricting access to memory or other hardware resources. User mode components can, e.g., use a shell to provide information to a user or receive input from the user.

Kernel mode components generally operate in a privileged security context. In this privileged security context, the components may be able to access hardware directly, read from and write to memory outside the components' address space, and control other resources. Thus, malicious or malfunctioning components can perform tasks that could be harmful to the operating system or undesired by users of the computer system. Users of computer systems may desire to make their operating system more secure to prevent such harmful or undesirable behavior. However, creators of components may not wish to provide information a user can use to prevent this behavior, or may be unable to provide such information because a kernel mode component generally cannot communicate directly with a user through a user interface.

SUMMARY

Techniques for securing applications, operating systems, and software systems in general are provided. In an embodiment, a system notifies a user that a security enforcement action is being taken even though the condition prompting the action is detected by a security engine that executes in kernel mode. The security engine enforces security policies that help to ensure that a vulnerability of an application or operating system cannot be exploited. In an embodiment, the security system may solicit input from a user relating to a security enforcement action even though the condition prompting the action is detected by a security engine that executes in kernel mode. Security policies may be defined as sets of rules, each having a condition and an action. The security system thus enables kernel mode components to provide notifications to or solicit input from a user.

DETAILED DESCRIPTION

Figure 1:
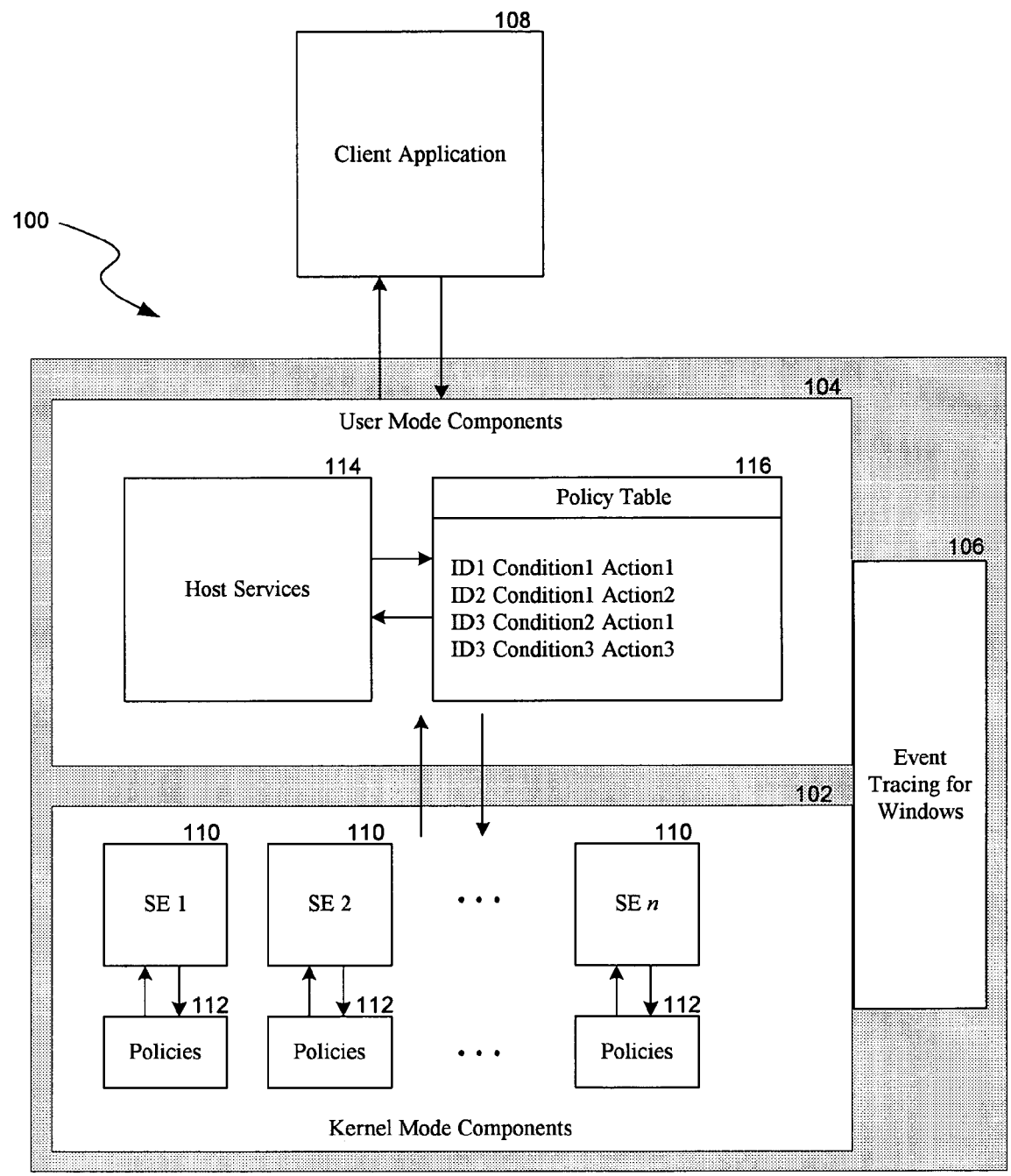
FIG. 1 is a block diagram illustrating components of a system for securing applications and operating systems in one embodiment.

Techniques for securing applications, operating systems, and software systems in general are provided. In an embodiment, a security system notifies a user that a security enforcement action is being taken even though the condition prompting the action is detected by a security engine that executes in kernel mode. The security engine enforces security policies that help to ensure that a vulnerability of an application or operating system cannot be exploited. For example, a security policy may indicate that a certain type of message that is received from another computer system should be dropped rather than forwarded to an application program. Receiving a message is considered to be a security enforcement event because the security engine needs to check the message to see whether a security enforcement action should be taken. The security policy may be defined using rules that specify conditions and actions. When a security enforcement event occurs, the security engine checks the rules of its policies to determine whether their conditions are satisfied. For example, a condition may be satisfied when a message is received that specifies a buffer size greater than 1 MB. When the condition of a rule is satisfied, the security engine performs the actions of the rule, such as dropping the message and notifying a user. Because kernel mode components generally cannot directly control the user interface presented to a user, the security system uses a user mode host services component to provide the notification to the user. To notify a user, the security engine sends a user notification event with an identifier of the rule whose condition was satisfied to the host services component. Upon receiving the user notification event, the host services component retrieves a notification description associated with the identifier and notifies the user in accordance with the retrieved notification description. The host services component may send a message to a notification application requesting that the notification be provided to the user. The notification application may execute on behalf of a logged-on user. If the user is not currently logged on, then the host services component may queue the message for delivery when the user logs on. In this way, a security engine can notify users of security enforcement actions even though the security engine executes in kernel mode.

In an embodiment, the security system solicits input from a user relating to a security enforcement action even though the condition prompting the action is detected by a security engine that executes in kernel mode. For example, a security policy may indicate that when a certain type of message is received from another computer system, the user's input is to be solicited before taking action on the message. A condition of a rule relating to this security policy may be to determine whether the message is received on a nonstandard communications port. When this condition is satisfied, the resulting action may be to solicit input from the user to determine whether the message should be accepted. Because the kernel mode security engine may not directly control the user interface presented to the user, the security system uses the user mode host services component to solicit the user's input. To solicit the input, the security engine invokes an application program interface ("API") of the host services component. In the invocation, the security engine sends an identifier of the rule whose condition was satisfied. Upon receiving the request from the security engine, the host services component retrieves an informational message associated with the identifier and solicits the user's input in accordance with the retrieved informational message. The host services component may send the informational message to a solicitation application and request it to provide the informational message to the user. The solicitation application may execute on behalf of a logged-on user and solicits input from the user. When the user's input is received, the solicitation application sends the input to the host services component, which provides the input to the security engine by returning from the invoked API. If the user is not presently logged on, however, then the host services component may return a default input (e.g., an input previously provided by the user in a similar contextual situation or as defined by the security policy). In this way, a security engine can solicit input from a user in relation to security enforcement actions even though the security engine executes in kernel mode.

In an embodiment, functions of the notification application and solicitation application are performed by the same component, and are referred to hereafter as "notification application." Notification applications may provide notifications, solicitations for user input, or both, in addition to other functions.

The actions of rules that implement a security policy indicate processing to be performed on an operation that caused the security enforcement event. These actions include, e.g., allowing the operation, denying the operation, notifying a user that the operation was performed, and soliciting input from the user on how to handle the operation.

When the indicated action is to allow or deny the operation, the security engine either allows or denies the operation, as indicated. As an example, a security policy may be to allow all outgoing messages on a port from an application, but to deny all outgoing messages on that port from any other application.

When the indicated action is to notify the user, the security engine communicates that the condition was satisfied to the host services component. The security engine may communicate this information by generating an event and indicating the identifier associated with the rule for the satisfied condition. An event tracing component of the operating system (or alternate suitable means for transferring an event from a kernel mode component to a user mode component) registers the event generated by the host services component, either asynchronously or in real-time. Upon determining that an event is registered, the host services component then retrieves from a policy table a message specified for the security policy based on the identifier indicated in the event, and requests a notification application to present the message to the user. The notification application causes the operating system to display the message to the user using a dialog box, an indication on a system tray, a caption in a balloon, or some other suitable user interface. Because user input is unnecessary, the notification to the user can be handled asynchronously, and the security engine does not need to wait for the user to view the notification.

When the indicated action is to solicit input from the user, the security engine calls an API of the host services component to request it to solicit input from the user and provides the identifier associated with the policy of the satisfied condition. The host services component then retrieves from a policy table a message specified for the policy based on the provided identifier, and requests a notification application to provide the message and solicit input from the user. The notification application causes the operating system to display the message to the user using a dialog box, an indication on a system tray, a caption in a balloon, or some other suitable user interface. The user may subsequently allow or deny the operation. The notification application, upon receiving the user's input, may provide the input to the host services component, which in turn may provide it to the security engine when the call to the API returns. Alternatively, one of the components may use a default response or a response previously provided by the user and cached by a component of the security system. The security engine then allows or denies the operation based on the user's input.

Components of the security system, such as the security engine, host services component, or notification application, may use cached responses. One or more of the components may store users' input and the contextual situation in which it was provided (e.g., a condition satisfied for a particular application program) in a cache. Then, if a component requesting the user's input from another component fails to receive a response from the other component in a period of time (e.g., the request times out because no user is logged on), then the component may check its cache to determine whether a response was previously stored for the same contextual situation. If no response is stored in the cache, the component may use a default action, e.g., one that was specified in the policy. Alternatively, the component may wait until the user provides an input if the operating system would not be adversely affected by waiting indefinitely. As examples, the notification application, host services component, or a security engine may each have a cache. The notification application caches a user's input. When the user's input is solicited again in a similar context, but the user does not provide an input in a timely manner, the notification application may retrieve the input previously provided by the user. The host services component may wait for an input from the notification application for a period of time. When no response is received from the notification application, the host services component may time out and use a response it previously cached in a similar context. Similarly, a security engine may wait for a period of time for a response from the host services component. When a response is not received in that period of time, the security engine may use a response it previously cached in a similar context.

The system discussed above enhances the security of an operating system by enabling kernel mode operating system components to provide information or solicit a user's input through a user interface. As an example, a user of a computer system may desire to be notified when a kernel mode software resource (e.g., device driver) is outdated and an update is available that resolves a serious security flaw. In such a case, a policy may be to check the device driver's version number, and send a notification when the version number is out of date. As another example, a user may desire to accept or reject requests by application programs to communicate through nonstandard communications ports. In such a case, a security policy may indicate to detect communications through nonstandard communications ports and solicit user input when such communications occur. By keeping a user informed and soliciting input, an application or operating system can be made more secure.

Turning now to the Figures, FIG. 1 is a block diagram illustrating an embodiment of a system for securing applications and operating systems. The system includes kernel mode components 102, user mode components 104, a component for transferring events from the kernel mode components to user mode components 106 such as an Event Tracing for WINDOWS component, and a client application program 108. The component for transferring events can operate asynchronously or in real-time. Components other than Event Tracing for WINDOWS are equally contemplated for communications between user mode and kernel mode components including, e.g., application program interface calls, sockets, etc. The system also includes security engines 110 and related policy tables 112. Each policy table contains rules referenced by a security engine. Alternatively, the security engines may all use one policy table or several policy tables and, in such a case, the table(s) would identify which security engine(s) each policy is for. The system further includes a host services component 114 and a related security policy table 116. The kernel mode components, user mode components, and event transfer component are all contained in an operating system 100.

Examples of security engines include, but are not limited to, an antivirus engine, a firewall engine, an intrusion detection engine, a vulnerability analysis engine, and a behavioral blocking engine. An antivirus engine includes functionality to protect an application or operating system from being infected by viruses, worms, Trojan horses, and so forth. A firewall engine includes functionality to protect the operating system from being accessed over a network connection by another undesired device (e.g., any device that a user or administrator of the computer system does not want accessing the computer system), and also includes functionality to block malicious code from propagating to other devices over the network. An intrusion detection engine includes functionality to identify when a malicious program and/or user has accessed the computer system (e.g., due to the antivirus and/or firewall engines having failed, etc.) and take appropriate action (e.g., notify a user or administrator, attempt to disable the malicious program or halt the malicious user's access, etc.). A vulnerability analysis engine includes functionality to attempt to detect vulnerabilities in the operating system (e.g., due to applications or security engines that have not been installed or updated correctly, components being configured incorrectly, and other unpatched vulnerabilities). A behavior blocking engine includes functionality to monitor applications running on the operating system and detect improper behavior (e.g., improper network or storage device access) by those programs. Security engines may be implemented in software, hardware, or a combination of software and hardware. Security engines may be implemented as WINDOWS "services."

Figure 2:
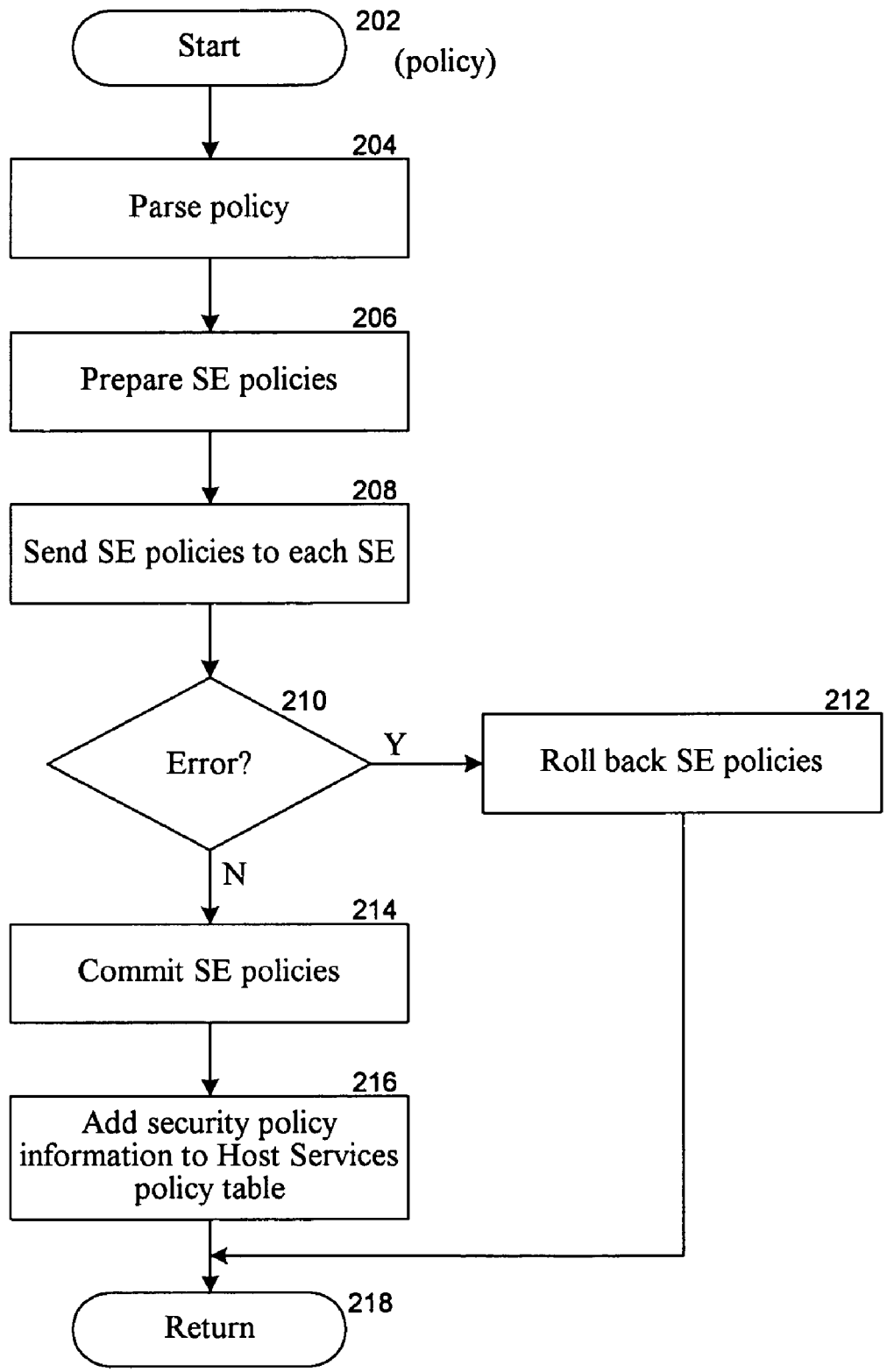
FIG. 2 is a flow diagram illustrating an embodiment of a routine for registering security policies.

FIG. 2 is a flow diagram illustrating an embodiment of a routine for registering security policies. The illustrated register_policy routine is performed by a host services component. The routine begins at block 202 where it receives an indication of a security policy as a parameter. The received security policy may be in various formats including, e.g., XML, text, or binary formats. At block 204, the routine parses the received security policy. Parsing a security policy includes determining conditions and actions, identifiers, etc. A condition of a policy indicates when a specified action should be taken. Example conditions include attempts to access a resource (e.g., memory locations, network addresses or ports, other programs, or files on a storage device), attempts to write data to particular locations (e.g., particular memory locations, or particular locations on a storage device), attempts to run particular programs, and various aspects of the current operating state of a computer system. Example actions include preventing a resource from being accessed, preventing data from being written to particular locations, preventing a program from being executed, or generating a notification that the occurrence of the condition in the rule was detected (e.g., recording its occurrence in a log, or sending a message to a user or other computer). Actions can be permissive in nature rather than preventive. Actions may also indicate that the logged-on user is to be notified or the user's input is to be solicited.

A condition and action are jointly referred to as a rule. Rules may be expressed as IF "condition" THEN "action." Identifiers may be associated with rules, and may be globally unique. Additional examples of rules include permitting certain application programs or services to update data files in a particular directory or folder, enabling receipt of traffic on port 21 if file transfer protocol (FTP) is enabled, and generating a virus warning message if a particular virus signature is detected. Other examples include generating an event if a particular application program has not been upgraded to a particular revision level, preventing access to a network if the application program has not been upgraded to a minimum version number, and preventing the computer system from receiving data via network port 35.

At block 206, the routine prepares security policies for security engines. As an example, a received security policy may indicate that a specified program is allowed to communicate on port 80, the user is to be notified when the program communicates on port 8080, and the user's input is to be solicited when the program attempts to communicate on any other port. The received security policy may also indicate that the program is allowed to access a specified storage device but the program's access requests to any other storage device are to be denied. In such a case, at block 206, the routine prepares a security policy for a security engine that handles network communications and another security policy for a security engine that handles storage devices. At block 208, the routine sends the security policies prepared at block 206 to each relevant security engine (e.g., a security engine for a network communications driver and a security engine for a storage device driver). At block 210, the routine determines whether the security engines to which the policies were sent at block 208 received and acknowledged the security policies. If the security engines did not successfully acknowledge the security policies, the routine continues at block 212. Otherwise, the routine continues at block 214.

At block 212, the routine sends a signal to all security engines that successfully acknowledged the sent security policies to roll back the security policies. The acknowledged security policies are rolled back to prevent security engines from enforcing only some of the security policies. If no error is received from a security engine after the security policies are sent, the routine may send a signal to the security engines to commit the sent security policies at block 214. In response to the signal, the security engines may store the security policies in a policy table accessible by the security engines. At block 216, the routine adds security policy information (e.g., rules) to the host services component's policy table. As an example, a security policy may contain information relating to messages to send to a user when either notifying a user or soliciting the user's input. These messages would be stored in the host services policy table. After either blocks 216 or 212, the routine returns at block 218.

Figure 3:
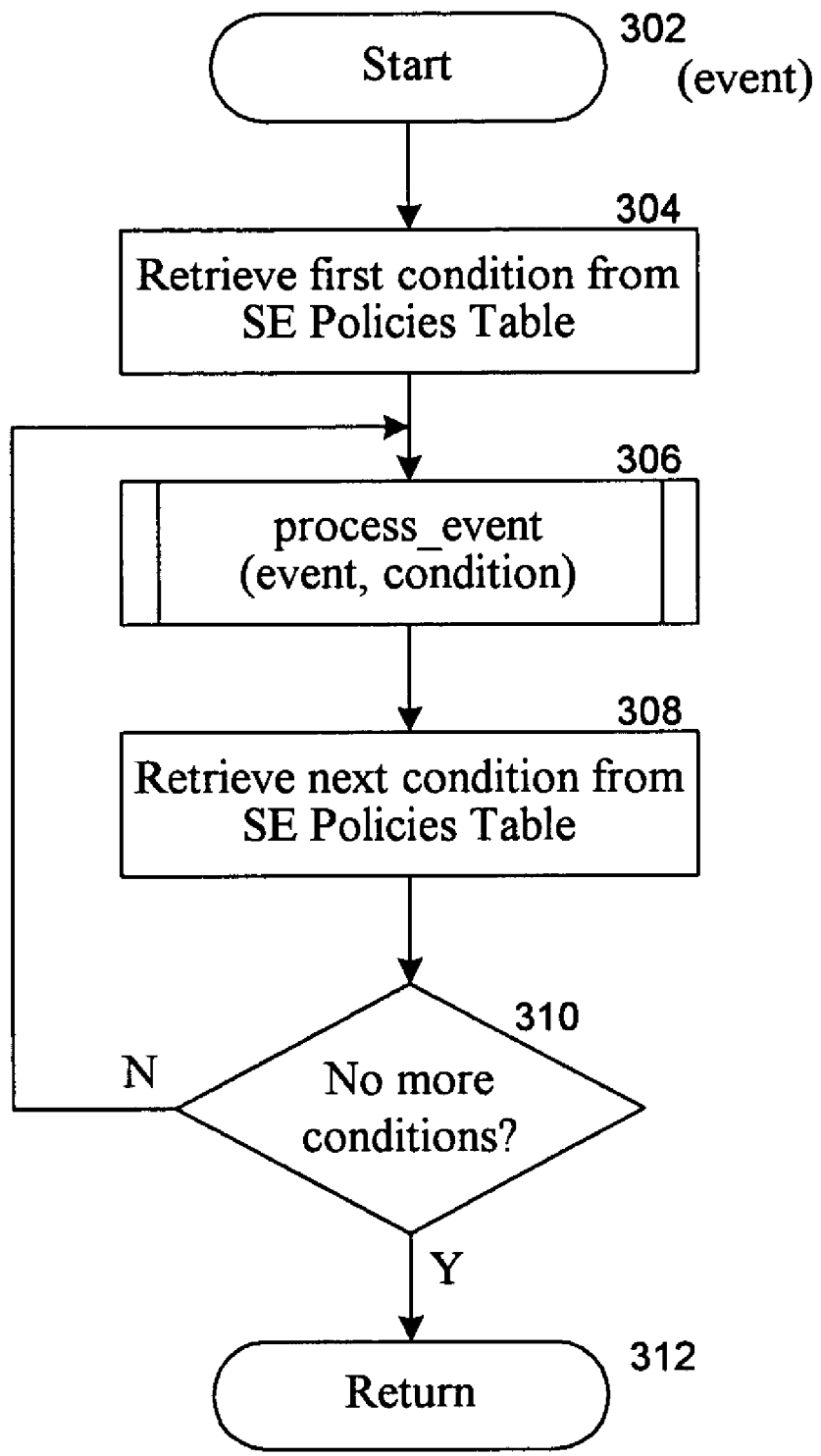
FIG. 3 is a flow diagram illustrating an embodiment of a routine for handling a security enforcement event.

FIG. 3 is a flow diagram illustrating an embodiment of a routine for handling a security enforcement event. The illustrated receive_event routine is performed by a security engine component when a security enforcement event occurs. Security enforcement events include, for example, detection of a computer virus, detection of an attempt to access confidential data, notification that a computer virus was destroyed, notification that a particular application program was halted or prevented from executing, changes to system state information, and so forth.

The routine begins at block 302 where it receives a security enforcement event as a parameter. Between blocks 304 and 310, the routine determines whether the received security enforcement event matches a rule of policies the security engine enforces. A security enforcement event matches a rule of a policy when the condition associated with the rule relates to the security enforcement event. At block 304, the routine retrieves a condition for a rule from the security engine's policies table. At block 306, the routine calls a process_event subroutine and passes to it the event and the retrieved condition as parameters. At block 308, the routine retrieves the next condition from the security engine's policies table. If at block 310 there are no more conditions, the routine returns at block 312. Otherwise, the routine continues at block 306.

Figure 4:
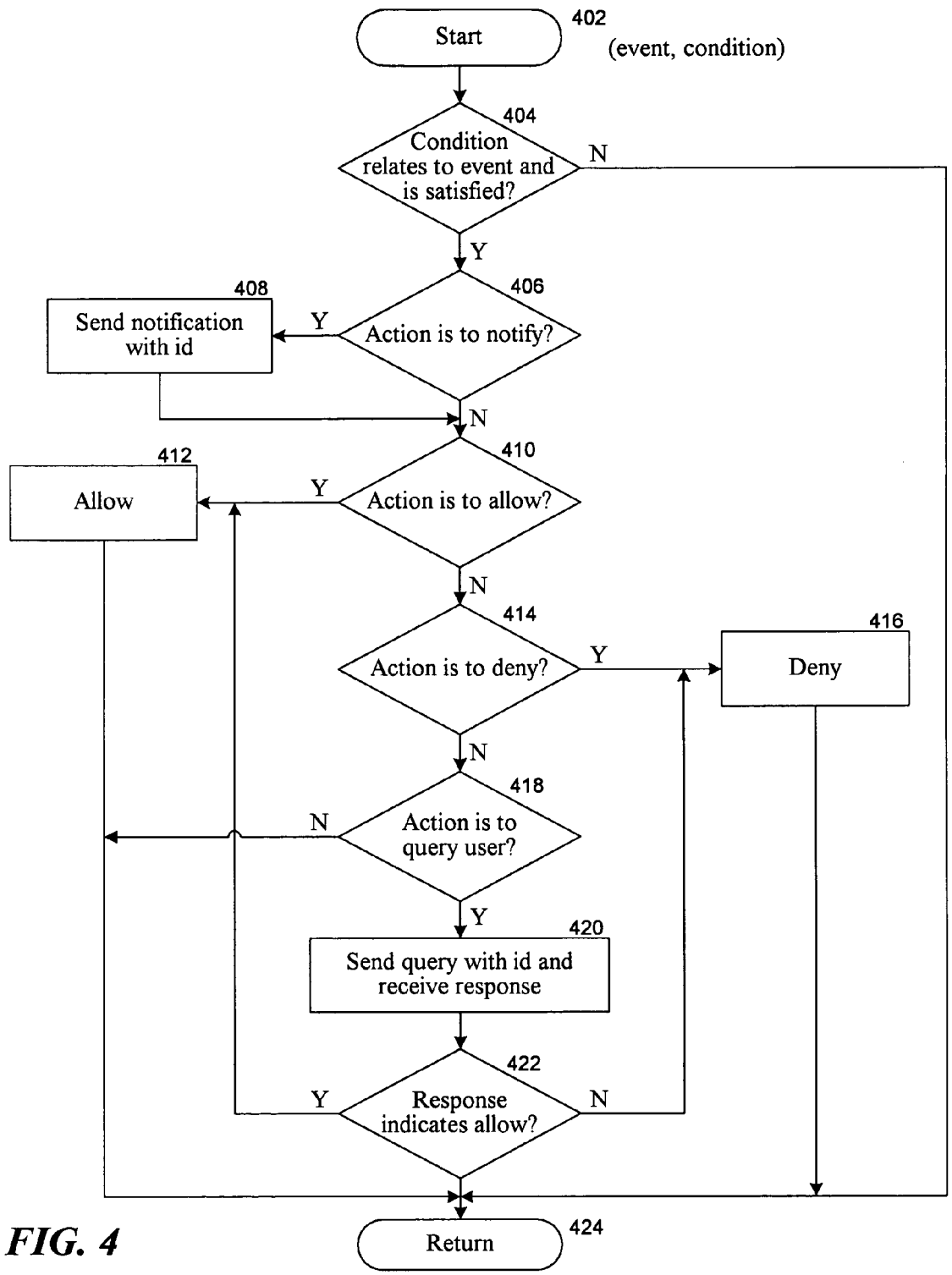
FIG. 4 is a flow diagram illustrating an embodiment of a routine for processing a security enforcement event.

FIG. 4 is a flow diagram illustrating an embodiment of a routine for processing a security enforcement event. The routine is performed by a security engine component. The routine begins at block 402 where it receives a security enforcement event and a condition as parameters. At block 404, the routine determines whether the condition relates to the security enforcement event and the condition is satisfied. As an example, if a security enforcement policy contains a rule with a condition relating to network communications on a specified port, and the security enforcement event indicates that a program has requested to send a message on the port specified in the condition, the condition would be satisfied. If the condition is satisfied, the routine continues at block 406. Otherwise, the routine continues at block 424. At block 406, the routine determines whether the action associated with the satisfied condition is to notify a user. As an example, a rule of a security enforcement policy may indicate the following condition and action: if a program communicates on port 8080, then the user is to be notified. If the action is to notify, the routine continues at block 408. Otherwise, the routine continues at block 410.

At block 408, the routine sends an event with the identifier associated with the rule of the satisfied condition to a component that is capable of transferring events from a kernel mode component to a user mode component, such as an Event Tracing for WINDOWS component. Alternatively, the routine calls an API of the host services component or communicates via sockets. The routine then continues at block 410.

At block 410, the routine determines whether the condition is to allow the operation that caused the security enforcement event. If the action is to allow the operation, the routine continues at block 412. Otherwise, the routine continues at block 414. At block 412, the routine allows the operation. Allowing the operation may include continuing to perform the operation that caused the security engine to intervene. The routine then continues at block 424. At block 414, the routine determines whether the action relating to the satisfied condition is to deny the operation. If the action is to deny the operation, the routine continues at block 416. Otherwise, the routine continues at block 418. At block 416, the routine denies the operation. Denying the operation may include returning an error message to the component requesting the operation. The routine then continues at block 424. At block 418, the routine determines whether the action relating to the satisfied condition is to query the user. As an example, a security enforcement policy indicates to query the user when a program attempts to communicate on a port other than ports 80 and 8080. If at block 418 the action is to query the user, the routine continues at block 420. Otherwise, the routine continues at block 424. At block 420, the routine calls an API of a host services component and sends to the host services component the identifier associated with the satisfied condition. The routine then receives a response from the host services component. If at block 422 the received response indicates that the operation is to be allowed, the routine continues at block 412. Otherwise, the routine continues at block 416. The routine returns at block 424.

Instead of (or in addition to) calling an API, the security engine could use an event tracing component or some other mechanism to communicate with the host services component.

Figure 5:
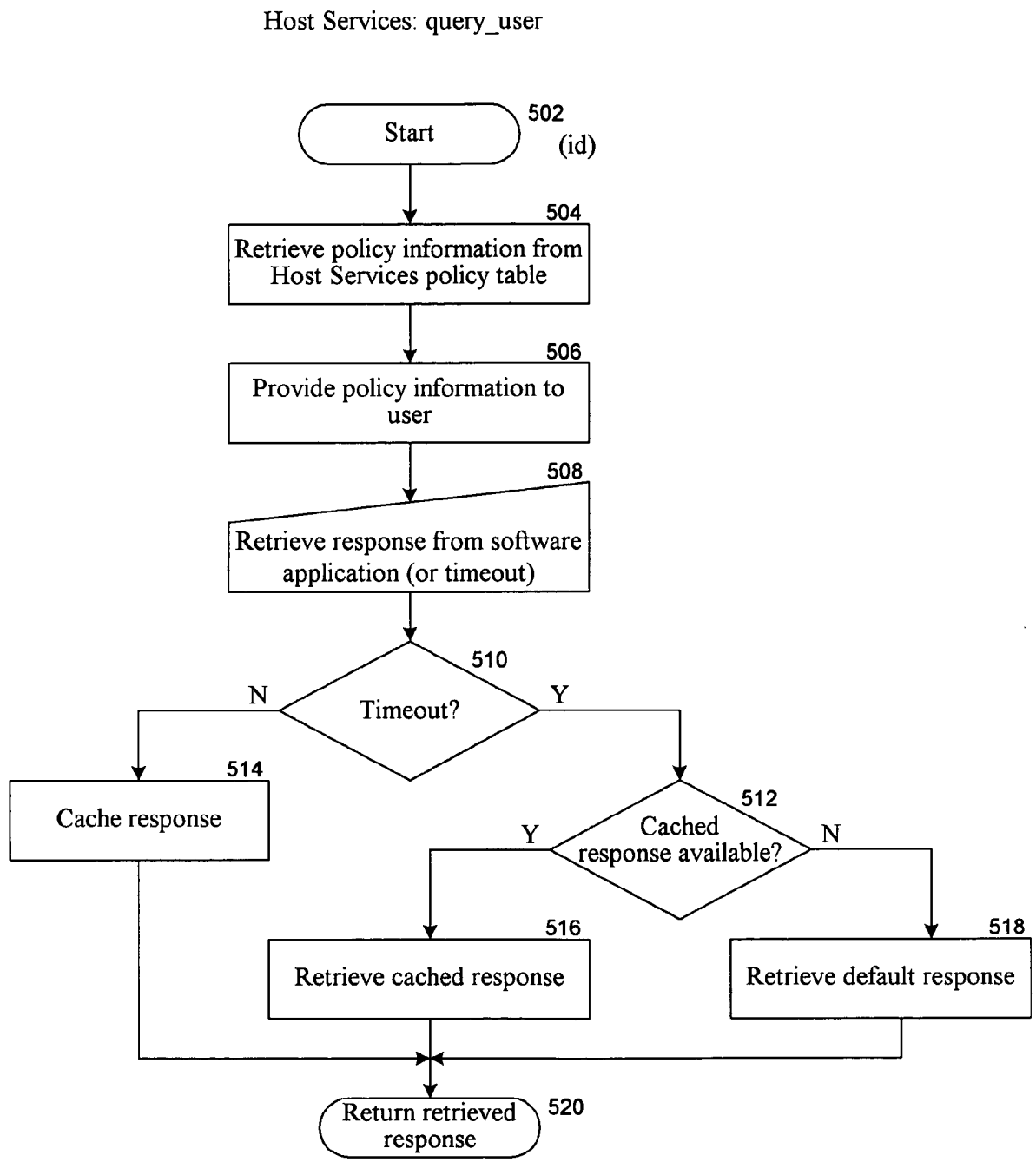
FIG. 5 is a flow diagram illustrating an embodiment of a routine for soliciting a user's input in relation to a security enforcement action.

FIG. 5 is a flow diagram illustrating an embodiment of a routine for soliciting a user's input. The routine is performed by a host services component. The routine begins at block 502 where it receives an identifier of a rule of a policy as a parameter. At block 504, the routine retrieves information relating to a rule of a policy corresponding to the received identifier from a policy table associated with the host services component. The retrieved information may include a message to send to the logged-on user and the type of input to be solicited. At block 506, the routine provides the retrieved information to the user. To provide the information to the user, the routine may use a notification application. At block 508, the routine retrieves a response from the notification application. Alternatively, the routine may determine that an amount of time has expired and the routine will no longer wait for a response from the notification application. At block 510, the routine determines whether the routine timed out or whether a response was received. If the routine timed out, the routine continues at block 512. Otherwise, the routine continues at block 514. At block 514, the routine caches the response provided by the user. Caching includes storing the response and contextual situation in which the response was provided. Contextual information may include, e.g., the security enforcement event, the program that caused it, and other system-related information such as the current state of the application or operating system. At block 512, the routine determines whether a cached response is available. If a cached response is available, the routine continues at block 516. Otherwise, the routine continues at block 518. At block 516, the routine retrieves the cached response. At block 518, the routine may retrieve from the host services policy table a default response for the policy for which input was solicited from the user. At block 520, the routine returns the retrieved response.

By caching a response and retrieving the cached response, the security system does not need to wait for a user to log onto the computer system before taking action on the security enforcement event. Alternatively, the user may not need to be solicited when the user indicates that all future security enforcement events are to be treated in the same manner, e.g., by indicating that the operation is to always be denied or allowed.

In an embodiment, a user's input in response to a solicitation may override defaults specified in a rule. Alternatively, the default may always be used when a user is not logged on.

Figure 6:
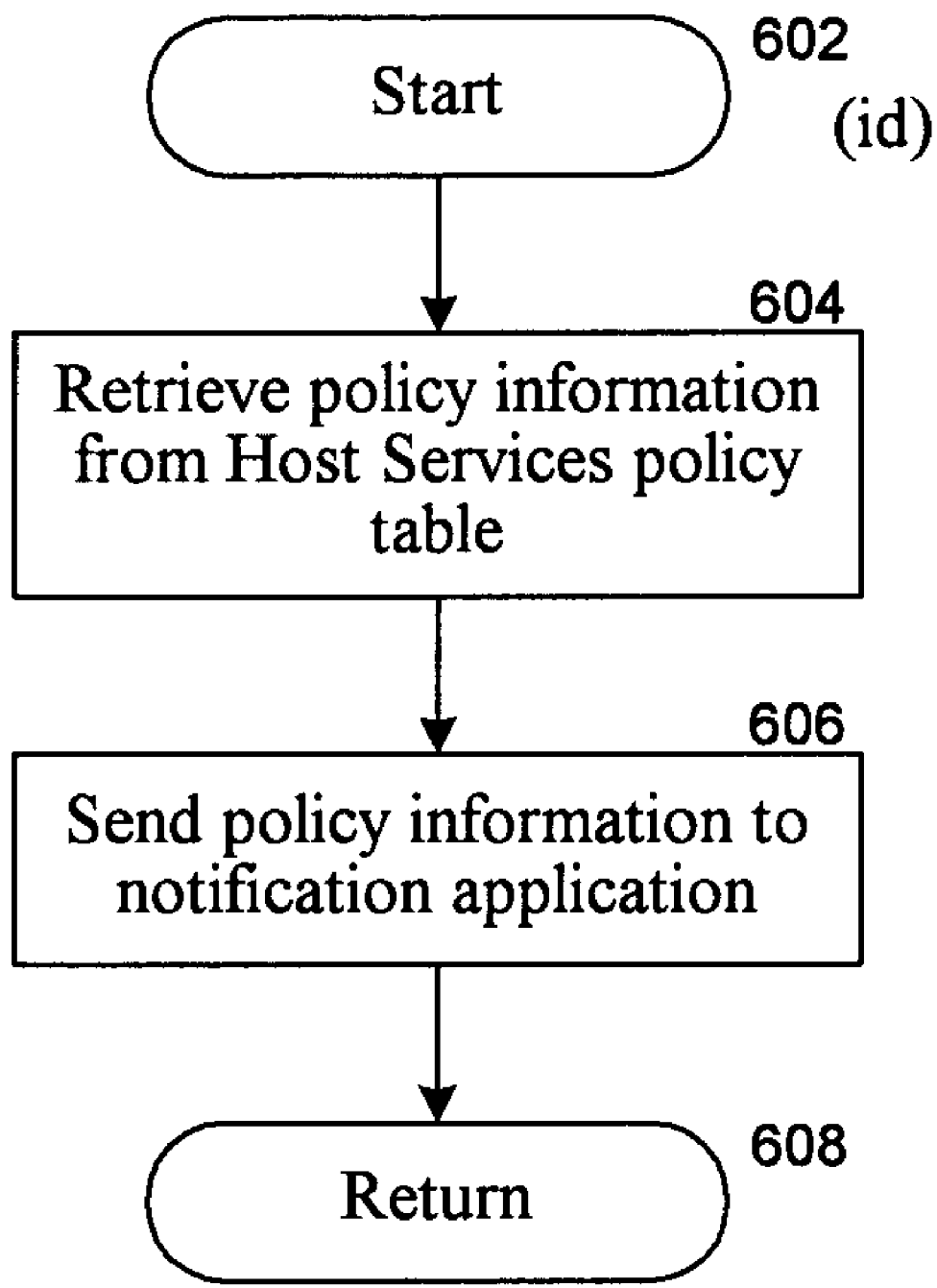
FIG. 6 is a flow diagram illustrating an embodiment of a routine for notifying a user of a security enforcement event.

FIG. 6 is a flow diagram illustrating an embodiment of a routine for notifying a user. The routine is performed by a host services component. The routine begins at block 602 where it receives as a parameter an indication of an identifier for a security policy. At block 604, the routine retrieves information relating to the security policy from a host services policy table. As an example, the routine may retrieve a message to be provided to the user in relation to the security policy. At block 606, the routine sends the retrieved policy information to a notification application. The notification application may use this message to provide a notification to a logged-on user. The routine returns at block 608.

The notification application may queue messages to be provided to a logged-on user. As examples, if a user is not logged on or does not indicate that a notification was received, the notification application may enqueue messages. After the user reviews the queued messages, the messages are dequeued. The notification application may also pool related messages. As an example, if a component makes five attempts to communicate on a port and a policy is to notify the user when an application program attempts to communicate on the port, the notification application may combine the messages and indicate simply that the application program attempted to communicate on the port five times.

In response to a solicitation for input, a user may indicate to the notification application that all further similar operations that caused the security enforcement event from the component that caused it are to be handled in the indicated manner. As an example, the user may indicate that all further communications by a browser on port 21 are to be allowed. Thereafter, components of the security system may not notify the user when the browser communicates on port 21.

In an embodiment, an administrator of a computer system may indicate that a user should not be provided with any notifications or solicitations for input.

Although particular examples discussed herein refer to security enforcement events, alternate embodiments may process any type of event or information. This information includes any information that might be utilized by security-related components in a computer system. Alternate embodiments can receive, process, and distribute information that is not necessarily related to the security of the computing devices.

The computing device on which the security system is implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 1 illustrates an example of a suitable operating environment in which the security system may be implemented. The operating environment is only one example of a suitable operating environment and is not intended to suggest any limitation as to the scope of use or functionality of the extensible wireless framework. Other well-known computing systems, environments, and configurations that may be suitable for use include personal computers, server computers, handheld or laptop devices including "smart" cellular telephones, multiprocessor systems, microprocessor-based systems, programmable consumer electronics, network PCs, minicomputers, mainframe computers, distributed computing environments that include any of the above systems or devices, and the like.

The security system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Aspects of the components described above may be further described in U.S. patent application Ser. Nos. 10/729,096 and 10/729,530, which are both assigned to the assignee of the present application and are incorporated herein in their entirety by reference.

From the foregoing, it will be appreciated that although specific embodiments of the invention have been described herein for purposes of illustration, various modifications may be made without deviating from the spirit and scope of the invention. As an example, various ways of exchanging information between a security engine and host services component are contemplated. Furthermore, various ways of identifying information to be presented to or collected from a user are equally contemplated. Accordingly, the invention is not limited except as by the appended claims.

We claim:

1. A method performed by a kernel mode operating system component of a computer system for securing its operating system, comprising:
    detecting in kernel mode that a user-mode component of the operating system is performing an operation;
    retrieving a policy previously registered for the operation, the policy including a condition and an action;
    determining whether the condition associated with the policy is satisfied; and
    when the condition associated with the policy is satisfied, performing an action associated with the condition; and causing a notification message relating to the operation to be sent to a user.

2. The method of claim 1 wherein the component of the operating system is an application.

3. The method of claim 1 wherein the action is to allow the operation.

4. The method of claim 1 wherein the action is to deny the operation.

5. The method of claim 1 wherein the method is performed by a security engine.

6. The method of claim 1 wherein the causing includes invoking an application program interface of a host services component that performs in user mode.

7. The method of claim 6 wherein the host services component provides input from the user when the application program interface invocation returns.

8. The method of claim 1 wherein the causing includes sending an event through event tracing component to a host services component that performs in user mode.

9. A method performed by a kernel mode operating system component of a computer system for securing its operating system, comprising:
    detecting, in kernel mode that a user mode component of the operating system is performing an operation;
    retrieving a policy previously registered for the operation, the policy including a condition and an action;
    determining whether the condition associated with the policy is satisfied; and
    when the condition associated with the policy is satisfied, causing input to be solicited from a user; and
    receiving an indication of a specified action based on the input from the user.

10. The method of claim 9 wherein the component of the operating system is an application.

11. The method of claim 9 including performing the specified action.

12. The method of claim 9 wherein the specified action is to deny the operation.

13. The method of claim 9 wherein the specified action is to allow the operation.

14. The method of claim 9 wherein the specified action is received from a host services component.

15. The method of claim 14 wherein the host services component receives an indication of the input from the user from a notification application.

16. The method of claim 9 wherein the causing includes requesting a user mode component to solicit the input from the user.

17. The method of claim 16 wherein the user mode component is a host services component.

18. The method of claim 9 wherein the causing includes invoking an application program interface of a host services component that performs in user mode.

19. The method of claim 18 wherein input from the user is received from the host services component when the application program interface invocation returns.

20. The method of claim 9 wherein the causing includes sending an event through an event tracing component to a host services component that performs in user mode.

21. A method performed by a user mode operating system component of a computer system for securing its operating system, comprising:
receiving an indication to communicate information to a user, the indication originating at a kernel mode component and including an identifier;
selecting information to communicate to the user based on the identifier included in the received indication;
sending the selected information to a notification application; and
when the communicated information includes a solicitation for input from the user,
receiving input from the notification application; and
forwarding the input to the kernel mode component.

22. The method of claim 21 wherein the sending includes invoking an application program interface of a host services component that performs in user mode.

23. The method of claim 22 wherein input from the user is received when the application program interface invocation returns.

24. The method of claim 21 wherein the sending includes sending an event through an event tracing component to a host services component that performs in user mode.

25. The method of claim 21 wherein the receiving input includes using a default input when input from the user is unavailable.

26. The method of claim 21 wherein the receiving input includes using a prior input from the user.

27. The method of claim 21 wherein the selected information includes a uniform resource locator that is used to find a resource that aids in securing the operating system.

28. The method of claim 27 wherein the selected information includes informational text relating to the resource that the uniform resource locator identifies.

29. The method of claim 21 wherein the selected information is displayed to the user.

30. The method of claim 29 wherein the selected information is displayed by the notification application.

31. The method of claim 29 wherein the selected information is displayed on an operating system task bar.

32. The method of claim 29 wherein the selected information is displayed in a window after the user positions a pointer on an area of a window.

33. The method of claim 29 wherein the selected information is queued for displaying to the user when the user is available to review the selected information.

34. The method of claim 29 wherein the selected information is pooled.

35. A system operating in kernel mode of an operating system, comprising:
a processor configured for use with the system:
a kernel-mode component that detects that a software component operating in user mode is performing an operation;
a component that retrieves a policy previously registered for the operation, the policy including a condition and an action;
a component that determines whether the condition associated with the policy is satisfied; and a component that, when the condition associated with the policy is satisfied,
causes an action associated with the condition to be performed and causes a notification message relating to the operation to be sent to a user.

36. The system of claim 35 wherein the software component is an application.

37. The system of claim 35 wherein the software component is an operating system component.

38. The system of claim 35 wherein the notification message is sent by invoking an application program interface of a host services component that performs in user mode.

39. The system of claim 38 wherein the host services component provides input from the user when the application program interface invocation returns.

40. The system of claim 35 wherein the notification message is sent by sending an event through an event tracing component to a host services component that performs in user mode.

41. The system of claim 35 wherein when the action is only to notify the user, the operation is allowed.

42. The system of claim 35 wherein the action is to allow the operation.

43. The system of claim 35 wherein the action is to deny the operation.

44. The system of claim 35 wherein the components are controlled by a security engine.

45. A computer-readable storage medium storing computer-executable instructions for performing steps in kernel mode of an operating system, comprising:
detecting that a component of the operating system is performing an operation;
retrieving a policy previously registered for the operation, the policy including a condition and an action;
determining whether the condition associated with the policy is satisfied; and
when the condition associated with the policy is satisfied,
performing an action associated with the condition; and
causing an informational message relating to the operation to be sent to a user wherein the informational message is a solicitation for input;
receiving an input from a user in response to the solicitation for input;
if the input indicates to allow the operation, allowing the operation; and
if the input indicates to deny the operation, denying the operation.

46. The computer-readable storage medium of claim 45 wherein the causing includes invoking an application program interface of a host services component that performs in user mode.

47. The computer-readable storage medium of claim 46 wherein input from the user is provided when the application program interface invocation returns.

48. The computer-readable storage medium of claim 45 wherein the causing includes sending an event through an event tracing component to a host services component that performs in user mode.

49. The computer-readable storage medium of claim 45 wherein the informational message is a notification.

* * * * *